UNITED STATES PATENT OFFICE.

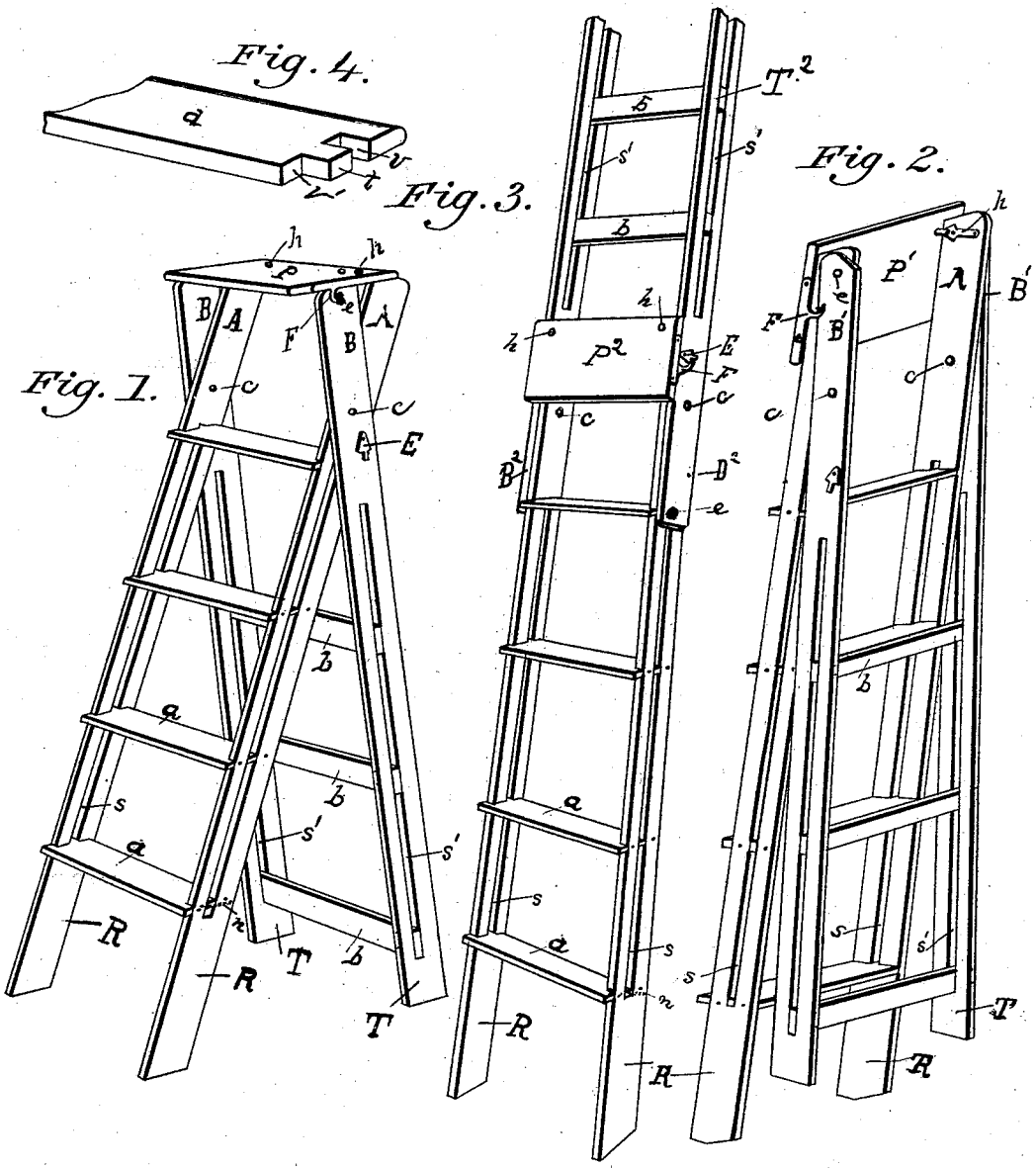

HIRAM B. SWARTZ, OF WOOSTER, OHIO.

EXTENSION STEP-LADDER.

SPECIFICATION forming part of Letters Patent No. 349,286, dated September 14, 1886.

Application filed September 21, 1885. Serial No. 177.771. (No model.)

*To all whom it may concern:*

Be it known that I, HIRAM B. SWARTZ, a citizen of the United States, residing at Wooster, in the county of Wayne and State of Ohio, have invented a new and useful Extension Step-Ladder, of which the following is a specification.

My invention relates to extension step-ladders.

Its objects are, first, to provide an improved method of hinging together the two sections of the ladder, whereby a folding platform is made to rest upon the ends of the standard extended above the pivot in the form of an X when used as a step-ladder, to constitute a platform therefor and secure the same from spreading apart, said folding platform also adapted to receive the strain at the center of the ladder when the sections are extended into a straight ladder and secure the same firmly in extended position. I accomplish these objects by the devices illustrated in the accompanying drawings, in which—

Figure 1 is a perspective view of my improved step-ladder. Fig. 2 is a view of the same folded. Fig. 3 is a view of the same extended into a straight ladder. Fig. 4 is an enlarged view of one end of the steps. Fig. 5 is an enlarged detail view of one of my platform-hinges.

Referring to the drawings, R T are the front and rear standards, respectively, of the step-ladder. $a$ are the series of front steps for the same, and $b$ are the series of rounds attached to the rear standards. The standards R T are pivoted together at $c$ a short distance from their upper ends respectively, so as to form the extended portions A B beyond the pivot $c$.

P is the step-ladder platform. It is hinged at each end and near its rear longitudinal edge by hinges $h$ upon the extensions A of the front standards, as shown, Fig. 5, and when used as a step-ladder it extends forward horizontally and rests at each end and near its front longitudinal edge upon the extensions B of the rear standards, as shown, Fig. 1, forming a platform for the step-ladder.

F is a downwardly-projecting hook attached to one or both ends of the platform P. This hook catches automatically upon the pin $e$, projecting from the standards, and thus secures the standards from spreading apart.

It is apparent the step-ladder may, at will, be folded together, as shown, Fig. 2. In such case the platform falls to the position shown at P', the supporting rear standards winging to the position shown at B'.

When desired, the rear standards, T, may be thrown outwardly on a line with the front standards, as shown, T². This is accomplished by elevating the platform P at its front edge, so that the hook F will pass over the pin $e$. As the standards are spread apart the hinged platform falls automatically upon its hinges into line with the standards, as shown, P², Fig. 3, and thereby constitutes one of the series of steps of the extended ladder.

E is a swinging stop pivoted upon the rear standards, T, in position to fall behind and engage the hook F when the rear standards are extended into line with the front standards, as aforesaid, thereby holding the ladder securely in extended position, as shown, Fig. 3. By elevating the outer end of the swinging stop E, and thereby disengaging the hook F, the ladder may be folded together or converted into a step-ladder, as aforesaid, the extensions B² of the rear standards in such case elevating the front part of the platform P² automatically into the position desired for use.

I am aware that ladders hinged in two sections held by a fastening device and having a folding platform are not new, and such I do not claim, broadly.

Heretofore extension-ladders pivoted together in two sections have been provided with a platform located below the pivots of the sections, so as to rest upon the opposite cross-rounds of the sections, respectively, and the fastening devices in such ladders have been also located below the pivots. Such construction is defective because the platform is not upon the summit of the ladder when used as a step-ladder. The platform also in such case is not in the proper place to form by means of it a step at the center of the ladder when the same is extended into a straight ladder, and such ladders are weak at the center when extended for want of sufficient stop to sustain the strain at that point.

My invention consists in pivoting one side of the platform securely upon the extended upper ends of the front section at a sufficient distance above the pivots of the sections to form a step in the series, and extending the upper ends of the rear section of the ladder above the pivots sufficient to bring the platform to a level upon the summit of the sections crossing each other in the form of an X.

It further consists in extending the platform laterally so as to bring each end of the same flush with the outer edge of the ladder, so it will lie upon the extended ends of the sections, and also form a rest or stop to receive the strain at the center when the rear section is extended into a straight ladder.

It further consists in combining with the folding platform suitable hooks, F, at the ends thereof and near the line of the front edge, so as to engage automatically the pins $e$ near the upper ends of the rear section and prevent the step-ladder from spreading apart, and also hold the platform securely down upon the summit of the step-ladder at a level. When the ladder is extended, the platform falls and these hooks engage automatically the swinging stops E upon the rear standards and secure the ladder in extended position, and also hold the platform firmly upon the face of the ladder, so as to form one of the series of steps in the extended ladder.

By pressing aside the swinging stop the ladder may be readily folded.

In every movement and position the folding platform and fastening devices act automatically.

Having thus described my invention, what I claim is—

1. In a folding ladder the standards of whose sections are pivoted together in the form of an X, the combination, with the extended upper ends of said sections, of a folding platform hinged above the pivots of the sections upon the summit of one section, so as to rest upon the summit of the other section when used as a step-ladder, substantially as shown and described.

2. In a folding ladder the standards of whose sections are pivoted together in the form of an X, the combination, with a folding platform hinged above the pivots of the sections upon the summit of one section, and adapted to rest upon the summit of the other section, as shown, of the fastening-hook F and pin $e$, fitted to co-act with each other, substantially as set forth, and for the purpose specified.

3. In a folding ladder the standards of whose sections are pivoted together below their summit, the combination, with said sections, of a folding platform hinged above the pivots of the sections upon the summit of the front section and extended at each end to form a rest or stop for the rear section when extended, fastening-hook F, and stop E, substantially as set forth.

In testimony whereof I hereunto set my hand in the presence of two witnesses.

HIRAM B. SWARTZ.

Witnesses:
LUCAS FLATTERY,
WILLIAM S. FLATTERY.